United States Patent
Guha et al.

(10) Patent No.: US 11,383,344 B2
(45) Date of Patent: Jul. 12, 2022

(54) PROCESS FOR AUTOMATED SANDING OF A VEHICLE COMPONENT SURFACE

(71) Applicant: Continental Structural Plastics, Inc., Auburn Hills, MI (US)

(72) Inventors: Probir Kumar Guha, Bloomfield Hills, MI (US); Philippe Bonte, Pouance (FR); Marc-Philippe Toitgans, Pouance (FR); Dominique Boyer, Pouance (FR); Mayur S. Shah, Auburn Hills, MI (US); Ohiole Ake, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 639 days.

(21) Appl. No.: 16/464,609

(22) PCT Filed: Nov. 29, 2017

(86) PCT No.: PCT/US2017/063646
§ 371 (c)(1),
(2) Date: May 28, 2019

(87) PCT Pub. No.: WO2018/102374
PCT Pub. Date: Jun. 7, 2018

(65) Prior Publication Data
US 2021/0101247 A1    Apr. 8, 2021

Related U.S. Application Data

(60) Provisional application No. 62/427,462, filed on Nov. 29, 2016.

(51) Int. Cl.
*B24B 19/26* (2006.01)
*B24B 23/02* (2006.01)
(Continued)

(52) U.S. Cl.
CPC .............. *B24B 19/26* (2013.01); *B24B 23/02* (2013.01); *B24B 51/00* (2013.01); *B24D 9/08* (2013.01); *B25J 11/0065* (2013.01)

(58) Field of Classification Search
CPC ... B24B 27/04; B24B 27/0015; B24B 27/003; B24B 27/0038; B24B 27/0046;
(Continued)

(56) References Cited

U.S. PATENT DOCUMENTS 3,345,785 A    10/1967  Riker
3,439,372 A *  4/1969  Collier .................. B66F 11/046
                                              451/354
(Continued)

FOREIGN PATENT DOCUMENTS

EP    3056312 A1    8/2016
JP    S61117059 A   6/1986
(Continued)

OTHER PUBLICATIONS

"Gimbal." Wikipedia.org. Accessed Mar. 11, 2022. (Year: 2022).*
(Continued)

*Primary Examiner* — Joel D Crandall
(74) *Attorney, Agent, or Firm* — Blue Filament Law PLLC

(57) ABSTRACT

A process for automated sanding of a vehicle component surface is provided and includes providing a sanding mechanism having a sanding head engaged with a housing, a rotary motor contained within the housing, the rotary motor having a drive shaft rotatable about an axis and extending outwardly therefrom, a radial plate attached to a first end of the drive shaft, and a sanding disk having an abrasive surface releasably attached to the radial plate; attaching the sanding head to a gimbal having a pressure sensor; powering the rotary motor driving rotation of the drive shaft, the radial plate and
(Continued)

the sanding disk in at least one of a clockwise or counter-clockwise direction; movably applying the sanding disk to the surface at a maintained constant pressure; and achieving a desired finish on the surface prepared to be primed and painted to a class A auto high sheen surface finish.

18 Claims, 1 Drawing Sheet

(51) Int. Cl.
*B24B 51/00* (2006.01)
*B24D 9/08* (2006.01)
*B25J 11/00* (2006.01)

(58) Field of Classification Search
CPC ..... B24B 27/0084; B24B 23/02; B24B 19/26; B24B 19/265
USPC ............................................ 451/270; 901/41
See application file for complete search history.

(56) References Cited

U.S. PATENT DOCUMENTS

| | | | |
|---|---|---|---|
| 4,712,289 A | 12/1987 | Stamm et al. | |
| 5,470,609 A * | 11/1995 | Leach | B29C 73/02 |
| | | | 427/195 |
| 5,509,848 A * | 4/1996 | Shimbara | B25J 9/1684 |
| | | | 451/24 |
| 6,183,355 B1 * | 2/2001 | Robinson | B24B 23/028 |
| | | | 451/418 |
| 6,264,534 B1 * | 7/2001 | Panyard | B24B 49/16 |
| | | | 451/24 |
| 7,118,452 B2 | 10/2006 | Wood | |
| 8,758,089 B2 | 6/2014 | Annen et al. | |
| 9,089,949 B2 | 7/2015 | Hunt | |
| 2004/0102136 A1 | 5/2004 | Wood et al. | |
| 2005/0181707 A1 * | 8/2005 | Wood | B24B 19/26 |
| | | | 451/11 |
| 2006/0019579 A1 * | 1/2006 | Braunschweig | B24D 9/08 |
| | | | 451/28 |
| 2006/0188654 A1 * | 8/2006 | Onoyama | C09C 1/3676 |
| | | | 524/497 |
| 2009/0167060 A1 | 7/2009 | Zanolin et al. | |
| 2010/0221982 A1 * | 9/2010 | Andrichik | B24D 99/00 |
| | | | 451/28 |
| 2013/0273818 A1 * | 10/2013 | Guan | B25J 11/0065 |
| | | | 451/340 |
| 2016/0151888 A1 | 6/2016 | Gottardelli | |

FOREIGN PATENT DOCUMENTS

| | | |
|---|---|---|
| JP | H02256456 A | 10/1990 |
| JP | H07024723 A | 1/1995 |
| JP | H05058180 U | 3/1995 |
| JP | 2008-540873 A | 11/2008 |
| JP | 2009517283 A | 4/2009 |
| JP | 2010522092 A | 7/2010 |
| JP | 2015196727 A | 11/2015 |

OTHER PUBLICATIONS

"Gimbal." Merriam-Webster Online Dictionary. Accessed Mar. 11, 2022. (Year: 2022).*
Int'l. Search Report for PCT/US2017/063646, dated Feb. 8, 2018.
Supplementary EU Search Report for EP17876346, dated Jun. 26, 2020.
Notification of Rejection issued in corresponding Japanese Patent Appln. No. 2019-517416, dated Oct. 18, 2021.

* cited by examiner

PROCESS FOR AUTOMATED SANDING OF A VEHICLE COMPONENT SURFACE

CROSS REFERENCE TO RELATED APPLICATIONS

This application claims priority to U.S. Provisional Application No. 62/427,462 filed Nov. 29, 2016, the contents of which is incorporated herein by reference as if explicitly and fully expressed herein.

FIELD OF THE INVENTION

The present invention in general relates to a process for automated sanding of a vehicle component surface; and in particular to a process for automated sanding of a vehicle component surface formed from sheet molding compound (SMC) or thermoplastic including movably applying a sanding disk to a thermoplastic or SMC vehicle component surface at a constant pressure to achieve a surface prepared to be primed and painted to a class A auto high sheen surface finish.

BACKGROUND OF THE INVENTION

The surface finish of a vehicle component is determined in large part by the method of manufacture. The unadulterated surface finish of a manufactured vehicle component lacks the class A auto high sheen surface finish generally required by the industry. Additional preparation steps are conventionally necessary to achieve a class-A automotive high sheen surface finish on a vehicle component surface. For example, one manufacturing method commonly used in the industry involves molding vehicle components from steel or aluminum. More recently, vehicle components are also being molded from SMC or thermoplastic. With this method of manufacture, vehicle component surface finish is dictated by the molding conditions, such as the quality of the mold surface itself, and resultant vehicle components often have poor surface finishes. Often, the mold itself will have rough surface regions, gouges and other non-uniformities. These imperfections are then transferred to a vehicle component surface by way of the molding process. As a result, additional time consuming and often costly preparation steps are necessary to achieve a desired surface finish. Poor surface finishes are exacerbated when molding vehicle components from SMC or thermoplastic owing in part to the physical and chemical properties of the SMC or thermoplastic formulation. Using SMC as an example, the SMC resin includes intermixed fibers and filler. Once inserted into a mold, the intermixed fiber and filler can begin to align and retard relative to the mold flow front. This results in the edges of a molded vehicle component being deficient in fibers and filler which leads to non-uniformities in the resultant vehicle component surface. To address this problem, one solution currently used in the industry to improve surface finish of resultant vehicle components includes the addition of additives such as low-profile additives (LPAs) into the SMC or thermoplastic formulations. However, addition of LPAs into formulations is not a cure-all as this additional step increases manufacturing costs.

Another common industry approach to improving surface quality involves sanding a vehicle component surface after manufacture using a sanding mechanism. Sanding often takes place after the application of a color coat of paint to a vehicle component surface, but prior to the application of a clear coat. The sanding operation is sometimes performed by a human technician. One problem associated with human effectuated sanding is that it is difficult for a human technician to maintain a constant pressure when applying the sanding mechanism to the vehicle component surface, both at discrete moments in time and also throughout the duration of the sanding operation. As such, sanding operations performed by human technicians often result in further irregularities on a vehicle component surface. Additional time-consuming and costly preparation steps are often necessary to rid a vehicle component surface of not only the irregularities caused by the molding process, but also the additional irregularities imparted to a vehicle component surface by a human effectuated sanding operation, before achieving a vehicle component surface prepared to be primed and painted to a class A auto high sheen surface finish.

Robotic sanding mechanisms have been introduced in an effort to address the aforementioned problems associated vehicle component formation processes as well as human effectuated sanding of vehicle component surfaces. However, even with robotic sanding mechanisms currently used in the industry, the sanding process remains time-consuming as currently used robotic sanding mechanisms fail to significantly reduce per component sanding time. Additionally, robotic sanding mechanisms currently used in the industry fail to achieve a vehicle component surface that is prepared to be primed and painted to a class A auto high sheen surface finish.

Current industry vehicle component surface preparation methods are not satisfactory in that they do not eliminate the need for inclusion of additives such as LPAs to vehicle component formulations in order to achieve a class A auto high sheen surface finish, they fail to address the problems and inefficiencies associated with human effectuated sanding operations, they fail to significantly reduce per component sanding time, and they fail to achieve a vehicle component surface prepared to be primed and painted to a class A auto high sheen surface finish.

Thus, for vehicle components requiring a class A auto high sheen surface finish, there exists a need for a process for automated sanding of a vehicle component surface that maintains a constant pressure of the sanding mechanism for the duration of its application to a vehicle component surface. There further exists a need for a process for automated sanding of a vehicle component surface that achieves a surface prepared to be primed and painted to a class A auto high sheen surface finish. There still further exists a need for a process for automated sanding of a vehicle component surface that eliminates the need for inclusion of additives to formulations used to form vehicle components in order to achieve a class A auto high sheen surface finish. There also exists a need for a process for automated sanding of a vehicle component surface that reduces the necessary per component sanding time while still achieving a vehicle component surface prepared to be primed and painted to a class A auto high sheen surface finish.

SUMMARY

An inventive process for automated sanding of a vehicle component surface is provided and includes providing a sanding mechanism having a sanding head engaged with a housing, a rotary motor contained within the housing, the rotary motor having a drive shaft rotatable about an axis and extending outwardly from the rotary motor, a radial plate attached to a first end of the drive shaft, the first end of the drive shaft being distal to a second end of the drive shaft relative to a longitudinal axis of the drive shaft, and a sanding disk having an abrasive surface releasably attached to the radial plate; attaching the sanding head to a gimbal having a pressure sensor; powering the rotary motor driving rotation of the drive shaft, the radial plate and the sanding disk in at least one of a clockwise or counterclockwise direction; movably applying the sanding disk to the vehicle component surface at a constant pressure; maintaining the constant pressure; and achieving a desired finish on the vehicle component surface, the desired finish being prepared to be primed and painted to a class A auto high sheen surface finish.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

An inventive process for automated sanding of a vehicle component surface is provided. The present invention has utility to maintain a constant pressure of the sanding mechanism for the duration of its application to a vehicle component surface. The present invention also has utility to achieve a vehicle component surface prepared to be primed and painted to a class A auto high sheen surface finish. The present invention has additional utility to eliminate the need for inclusion of additives to formulations used to form vehicle components in order to achieve a class A auto high sheen surface finish. The present invention has further utility to reduce per component sanding time while still achieving a vehicle component surface prepared to be primed and painted to a class A auto high sheen surface finish.

It is to be understood that in instances where a range of values are provided that the range is intended to encompass not only the end point values of the range but also intermediate values of the range as explicitly being included within the range and varying by the last significant figure in the range. By way of example, a recited range from 1 to 4 is intended to include 1-2, 1-3, 2-4, 3-4, and 1-4.

Figure 1:
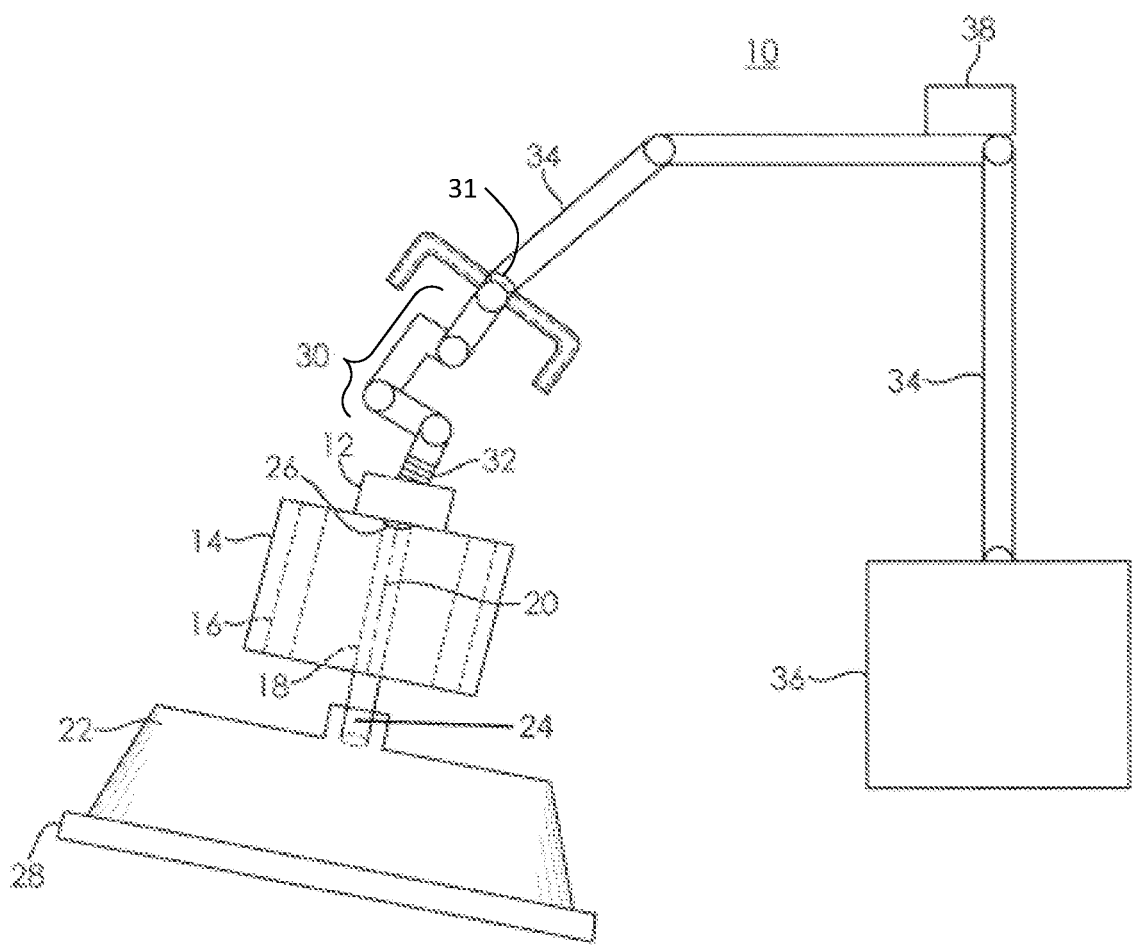
FIG. 1 is a perspective view of a sanding mechanism in accordance with an embodiment of the invention.

Referring now to the figures, FIG. 1 is a perspective view of a sanding mechanism used in the inventive process for automated sanding of a vehicle component surface shown generally at 10. It is appreciated that the sanding mechanism may be a random orbital sander. The sanding mechanism 10 has a sanding head 12 engaged with a housing 14. A rotary motor 16 is contained within the housing 14. A drive shaft 18 rotatable about an axis 20 extends outwardly from the rotary motor 16. A radial plate 22 is attached to a first end 24 of the drive shaft 18. It is appreciated that the first end 24 is distal to a second end 26 of the drive shaft 18 relative to a longitudinal axis 20 of the draft shaft 18. A sanding disk 28 is releasably attached to the radial plate 22. It is appreciated that the sanding disk 28 may be releasably attached to the radial plate 22 with a hook-and-loop adhesive. It is further appreciated that two or more independently rotating drive shafts, radial plates and sanding disks may be present in the sanding mechanism 10 (not pictured). It is also appreciated that the sanding disk 28 has an abrasive surface which contacts a vehicle component surface during the inventive automated sanding process. It is appreciated that the sanding disk 28 may be formed from sandpaper having a grit of between 40 and 2000. It is further appreciated that the sanding disk 28 is more preferably formed from sandpaper having a grit of between 500 and 1500. It is still further appreciated that the sanding disk 28 is most preferably formed from 1000 grit sandpaper. The sanding head 12 is attached to a gimbal 30. It is appreciated that the gimbal 30 has a pressure sensor 32 operable to detect minute fluctuations in pressure being applied by the sanding mechanism 10 to a vehicle component surface. It is further appreciated that the pressure sensor 32 is operable to communicate these detected minute fluctuations in pressure to other electronic or robotic devices in real-time. The rotary motor 16 is powered, driving rotation of the drive shaft 18, the radial plate 22 and the sanding disk 28 in at least one of a clockwise or counterclockwise direction. It is appreciated that the rotary motor 16 may be powered by a number of methods commonly known in the art including by way of non-limiting example, electrical power, battery power or compressed air. Once powered, the rotating sanding disk 28 is movably applied to the vehicle component surface at a constant maintained pressure until a desired surface finish is achieved on the vehicle component surface. In some inventive embodiments, the desired surface finish is a surface finish prepared to be primed and painted to a class A auto high sheen surface finish. It is appreciated that the sanding disk 28 may be movably applied to the vehicle component surface for a duration of between 30 seconds and 240 seconds until achieving the desired surface finish. It is further appreciated that the sanding disk 28 is more preferably movably applied to the vehicle component surface for a duration of between 45 seconds and 180 seconds until achieving the desired surface finish. It is still further appreciated that the sanding disk 28 is most preferably movably applied to the vehicle component surface for a duration of between 60 seconds and 120 seconds until achieving the desired surface finish. It is appreciated that the vehicle component being automatically sanded may be formed from sheet molding compound (SMC) or thermoplastic. It is further appreciated that the vehicle component being automatically sanded may have a coating of conductive primer. Owing in part to the constant maintained pressure being applied to the vehicle component surface that far exceeds the capabilities of a human technician, the inventive process is able to achieve the desired surface finish in a fraction of the time taken by a human technician and in less time than robotic systems currently used in the industry. Another benefit of the inventive process is the elimination of the need for inclusion of chemical additives into SMC or thermoplastic formulations in order to achieve a vehicle component surface prepared to be primed and painted to a class-A automotive high sheen surface finish. Instead, the constant maintained pressure being applied to the vehicle component surface by the inventive process achieves a surface prepared to be primed and painted to a class A auto high sheen surface finish. In another inventive embodiment, the gimbal 30 is attached to a robotic arm 34 movably attached to a base 36. It is appreciated that the robotic arm 34 is in electronic communication with the pressure sensor 32. It is further appreciated that the robotic arm 34 maintains a constant pressure being applied by the sanding disk 28 to a vehicle component surface by automatically adjusting in response to minute pressure fluctuation data received from the pressure sensor 32. It is still further appreciated that the robotic arm 34 may be pneumatically adjustable. In some inventive embodiments, a constant pressure is maintained using an air logic controller 38 in fluid communication with the robotic arm 34 and in electronic communication with the pressure sensor 32. It is appreciated that the air logic controller 38 receives high pressure air from a source. It is further appreciated that the air logic controller 38 automatically decreases or increases the received air pressure in response to minute pressure fluctuation data received from the pressure sensor 32. It is still further appreciated that the automatic adjustments to the air pressure allow the air logic controller 38, via the robotic arm 34, to maintain a constant pressure being applied by the sanding disk 28 to the vehicle component surface.

Figure 2:
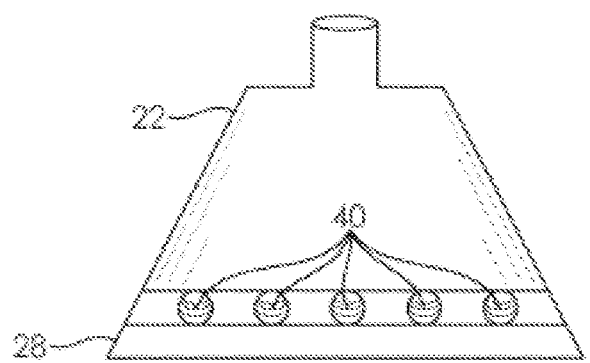
FIG. 2 is a perspective view of a radial plate with attached sanding disk in accordance with an embodiment of the invention.

FIG. 2 is a perspective view of a rotary plate 22 with attached sanding disk 28 according to one inventive embodiment. It is appreciated that 360-degree pressure contact of the sanding disk 28 with the vehicle component surface is achieved. It is further appreciated that the 360-degree pressure contact may be achieved by flexing a plurality of flexible members 40 attached to the radial plate 22 and in contact with the sanding disk 28.

To begin the inventive automated sanding process, the sanding head 12 of the sanding mechanism 10 is attached to the gimbal 30 having a pressure sensor 32. It is appreciated that the gimbal 30 allows the sanding mechanism 10 a range of motion about at least one axis. It is further appreciated that the gimbal 30 allows the sanding mechanism to adapt and conform to varying contours of the vehicle component surface while still maintaining a constant pressure being applied by the sanding disk 28 to the vehicle component surface. The pressure sensor 32 detects minute fluctuations in pressure being applied by the sanding mechanism 10 to the vehicle component surface. It is appreciated that the pressure sensor 32 electronically communicates the detected pressure fluctuation data to other electronic or robotic devices in real-time. It is further appreciated that these other electronic or robotic devices, such as the robotic arm 34 may be releasably attached 31 to the gimbal 30 and may automatically adjust in response to pressure fluctuation data received from the pressure sensor 32 in order to maintain a constant pressure being applied by the sanding mechanism 10 to the vehicle component surface. In some inventive embodiments a maintained constant pressure being applied by the sanding mechanism 10 to the vehicle component surface is achieved using an air logic controller 38 as described herein above.

The rotary motor 16 is then powered driving rotation of the drive shaft 18, the radial plate 22 and the sanding disk 28 in at least one of a clockwise or counterclockwise direction. It is appreciated that the rotary motor 16 may be powered by a number of methods commonly known in the art including by way of non-limiting example, electrical power, battery power or compressed air. It is further appreciated that powering the rotary motor 16 may drive rotation of two or more independently rotating drive shafts, radial plates and sanding disks.

Once powered, the rotating sanding disk 28 is movably applied to the vehicle component surface at a constant maintained pressure as described herein above. It is appreciated that owing in part to the sanding disk 28 being formed from sandpaper with the specific grit ranges as described herein above, in conjunction with the constant maintained pressure afforded by the sanding mechanism 10, the inventive process for automated sanding is able to impart a finish on a vehicle component surface that is prepared to be primed and painted to a class A auto high surface finish. It is further appreciated that this finish is achieved by the inventive process in far less time than that of sanding methods currently used in the industry. The inventive process is able to achieve a uniform surface finish on a vehicle component such that the vehicle component surface is prepared to be primed and painted to a class A auto high sheen surface finish within 30 seconds to 240 seconds. More preferably within 45 seconds and 180. Most preferably within 60 seconds and 120 seconds. It is still further appreciated that the surface finish on a vehicle component that is prepared to be primed and painted to a class A auto high sheen surface finish is achieved by the inventive process without the need for inclusion of additives into SMC or thermoplastic formulations. It is also appreciated that the final appearance of a vehicle component surface after the inventive process has been performed may be comparable to top coated steel. The inventive automated sanding process represents an improvement over current industry practices in that without inclusion of additives into vehicle component formulations, current sanding methods are deficient in removing imperfections and non-uniformities on the vehicle component surface. As a result, poor paint adhesion is a common phenomenon, owing in part to the fact that the paint has difficulty adhering to non-uniform substrates. The inventive automated sanding process not only eliminates the costly and time-consuming step of inclusion of additives into vehicle component formulations, it also achieves a more uniform vehicle component surface finish which improves paint adhesion to the vehicle component surface, enabling the inventive process to achieve a vehicle component surface that is prepared to be primed and painted to a class A auto high sheen surface finish.

As a person skilled in the art will recognize from the previous detailed description and from the figures and claims, modifications and changes can be made to the preferred embodiments of the invention without departing from the scope of this invention defined in the following claims.

The invention claimed is:

1. A process for automated sanding of a vehicle component surface comprising:
   providing a sanding mechanism having a sanding head engaged with a housing, a rotary motor contained within said housing, the rotary motor having a drive shaft rotatable about an axis and extending outwardly therefrom, a radial plate attached to a first end of the drive shaft, the first end being distal to a second end relative to a longitudinal axis of the drive shaft, and a sanding disk having an abrasive surface releasably attached to the radial plate;
   attaching the sanding head to a gimbal having a pressure sensor such that the rotary motor is distal to the gimbal;
   powering the rotary motor driving rotation of the drive shaft, the radial plate and the sanding disk in at least one of a clockwise or counterclockwise direction;
   movably applying the sanding disk to said vehicle component surface at a constant pressure;
   maintaining said constant pressure; and
   achieving a smooth finish on said vehicle component surface suitable for priming and painting to a class A auto high sheen surface finish.

2. The process of claim 1 wherein said vehicle component is formed from sheet molding compound (SMC).

3. The process of claim 1 wherein said vehicle component is formed from thermoplastic.

4. The process of claim 1 wherein said vehicle component surface having a coating of conductive primer.

5. The process of claim 1 wherein the sanding disk is formed from a sandpaper having a grit of between 40 and 2000.

6. The process of claim 1 wherein the sanding disk is formed from a sandpaper having a grit of between 500 and 1500.

7. The process of claim 1 wherein the sanding disk is formed from a 1000 grit sandpaper.

8. The process of claim 1 further comprising releasably attaching said gimbal to a robotic arm movably attached to a base, said robotic arm being in electronic communication with said pressure sensor, said robotic arm maintaining said constant pressure by automatically adjusting in response to data received from said pressure sensor.

9. The process of claim 8 wherein said robotic arm is pneumatically adjustable.

10. The process of claim 1 further comprising maintaining said constant pressure using an air logic controller.

11. The process of claim 1 further comprising movably applying the sanding disk to said vehicle component surface for a duration of between 30 seconds and 240 seconds.

12. The process of claim 1 further comprising movably applying the sanding disk to said vehicle component surface for a duration of between 45 seconds and 180 seconds.

13. The process of claim 1 further comprising movably applying the sanding disk to said vehicle component surface for a duration of between 60 seconds and 120 seconds.

14. The process of claim 1 further comprising achieving 360-degree pressure contact of the sanding disk with said vehicle component surface.

15. The process of claim 14 wherein achieving 360-degree pressure contact includes flexing a plurality of flexible members attached to the radial plate and in contact with the sanding disk.

16. The process of claim 1 wherein said sanding mechanism is a random orbital sander.

17. The process of claim 1 further comprising releasably attaching the sanding disk to the radial plate with a hook-and-loop attachment.

18. The process of claim 1 wherein the pressure sensor is positioned on a distal end of the gimbal.

* * * * *